United States Patent [19]
Lech

[11] Patent Number: 5,907,198
[45] Date of Patent: *May 25, 1999

[54] TRICKLE POWER SUPPLY

[75] Inventor: David Allen Lech, Hoffman Estates, Ill.

[73] Assignee: Molex Incorporated, Lisle, Ill.

[ * ] Notice: This patent is subject to a terminal disclaimer.

[21] Appl. No.: 08/658,773

[22] Filed: Jul. 30, 1996

Related U.S. Application Data

[63] Continuation-in-part of application No. 08/611,228, Mar. 5, 1996, Pat. No. 5,742,105.

[51] Int. Cl.⁶ .................................................. H01H 47/00
[52] U.S. Cl. ........................................... 307/125; 307/139
[58] Field of Search .................................... 307/112, 116, 307/125, 126, 139, 140

[56] References Cited

U.S. PATENT DOCUMENTS

| | | | |
|---|---|---|---|
| Re. 27,596 | 3/1973 | Hurd, III .................................. | 340/210 |
| 3,562,729 | 2/1971 | Hurd, III .................................. | 340/210 |
| 3,763,396 | 10/1973 | Shilling .................................... | 315/307 |
| 4,121,113 | 10/1978 | Whit et al. ............................... | 307/140 |
| 4,656,365 | 4/1987 | Billings .................................... | 307/140 |
| 4,716,301 | 12/1987 | Willmott et al. ........................ | 307/115 |
| 4,947,278 | 8/1990 | Nichols, III .............................. | 361/46 |
| 5,194,858 | 3/1993 | Erwin .................................. | 340/825.77 |
| 5,365,114 | 11/1994 | Tsurushima et al. ................... | 307/10.1 |
| 5,742,105 | 4/1998 | Lech ....................................... | 307/125 |

*Primary Examiner*—Jeffrey Gaffin
*Assistant Examiner*—Jonathan S. Kaplan
*Attorney, Agent, or Firm*—Stephen Z. Weiss

[57] ABSTRACT

A trickle power supply for a light switch module according to the invention enables power to an electronic circuit to be taken directly off the hot line. The power supply operates under what is referred to as the "switched leg theory". All power is taken off the standard switched leg of the light circuit. The power supply bleeds enough current to power its electronic circuitry without turning on the load device, i.e., the light. At the same time, the maximum current to the load is limited to prevent shorting out of the power supply which would effectively disable the switch module.

19 Claims, 3 Drawing Sheets

1

TRICKLE POWER SUPPLY

This application is a Continuation-In-Part of U.S. patent application Ser. No. 08/611,228 filed on Mar. 5, 1996 now U.S. Pat. No. 5,742,105.

SUMMARY OF THE INVENTION

This invention relates to automated wall switches for lights, or the like, and more particularly, to powering electronic circuitry of the switch leg lighting circuit.

BACKGROUND OF THE INVENTION

Recent developments in home and office automation systems provide both automatic and supervisory control of switched loads. In a home the loads typically consist of lights or outlet receptacles. In commercial applications motors and other type load devices might also be used. Existing automation systems include plural modules, typically one for each load, connected by custom wiring to permit automatic and supervisory control. Further improvements in automation systems contemplate eliminating the custom wiring. Instead, control signals are transmitted over the power wires using power line carrier technology. This allows automation to be used in both new construction and retrofit applications without additional wiring.

With the automation systems each module, such as for an outlet receptacle or wall switch, includes an electronic circuit for receiving and responding to commands, or initiating commands, from or to other modules. The electronic circuit requires power. Typically, power is provided by connecting to the hot and neutral power lines. However, a typical light circuit, such as for a ceiling light, often does not have the neutral wire at the switch. Instead, the neutral connection is made directly to the light fixture and only the hot wire is sent to the wall switch. Thus, there is a problem in powering a wall switch module without the presence of a neutral conductor. This can be resolved by stringing a neutral conductor through an existing conduit, if available. However, doing so requires additional wiring, eliminating one of the above-mentioned advantages of the further improved systems.

The present invention is directed to solving one or more problems discussed above, in a novel and simple manner.

SUMMARY OF THE INVENTION

In accordance with the invention there is provided a switch circuit which takes power from across a switch to power a power supply circuit.

Broadly, there is disclosed herein a switch circuit for selectively supplying power to a load from a source of AC power including a hot line and a neutral line, the neutral line being connected directly to the load. The switch circuit includes a controlled switch connected between the hot line and the load. A power supply circuit has an AC input connected across the controlled switch and includes means for converting AC power at the AC input to DC power. Input means determine the operating status of the load. A control circuit is powered by the DC power from the power supply circuit and is connected to the input means and the controlled switch. The control circuit controls switching of the controlled switch to maintain the operating status of the load determined by the input means. The control circuit includes means for limiting conduction time of the controlled switch during each AC operating cycle to provide sufficient AC power across the switch to power the power supply circuit.

In one aspect of the invention the controlled switch comprises a gate controlled switch, namely a triac.

In accordance with another aspect of the invention the power supply circuit includes a bridge rectifier circuit converting AC power to unregulated DC power and an off-line power supply controller converting the unregulated DC power to regulated DC power. The off-line power controller comprises an integrated circuit operating as two cascaded flyback converters, each operating in the discontinuous mode, and both driven from an external power switch. The integrated circuit forces the power switch on time to be inversely proportional to input voltage and power switch off time is inversely proportional to output voltage.

In accordance with a further aspect of the invention, the control circuit comprises a processing circuit and the limiting means limits conduction to approximately eighty percent of available power.

There is broadly disclosed in accordance with another aspect of the invention a light switch circuit for selectively supplying power to an incandescent light from a source of AC power including a hot line and neutral line, the neutral line being connected directly to the load. The light switch circuit comprises a gate controlled switch connected between the hot line and the light. A power supply circuit has an AC input connected across the controlled switch and includes means for converting AC power at the AC input to DC power. Input means determine if the light should be on or off. A control circuit is powered by DC power from the power supply circuit and is connected to the input means and the gate controlled switch. The control circuit controls switching of the gate controlled switch to turn the light on or off as determined by the input means. The control circuit includes means for limiting conduction time of the gate controlled switch during each AC operating cycle when the light is on to provide sufficient AC power across the gate controlled switch to power the power supply circuit.

In accordance with a further aspect of the invention, the input means comprises a power line transceiver circuit operatively connected across the switch and using a carrier signal at a select frequency impressed on the power line for determining operating status of the load. A band stop filter circuit is coupled in series with the controlled switch, the filter circuit filtering out signals at the select frequency.

A trickle power supply according to the invention solves the above problem by enabling power to the electronic circuit to be taken directly off the hot line. The power supply operates under what is referred to herein as the "switched leg theory". All power is taken off the standard switched leg light circuit. The power supply bleeds enough current to power its electronic circuitry without turning on the load device, i.e., the light. At the same time, the maximum current to the load is limited to prevent shorting out of the power supply which would effectively disable the switch module.

Further features and advantages of the invention will be readily apparent from the specification and from the drawing.

DETAILED DESCRIPTION OF THE INVENTION

Figure 1:
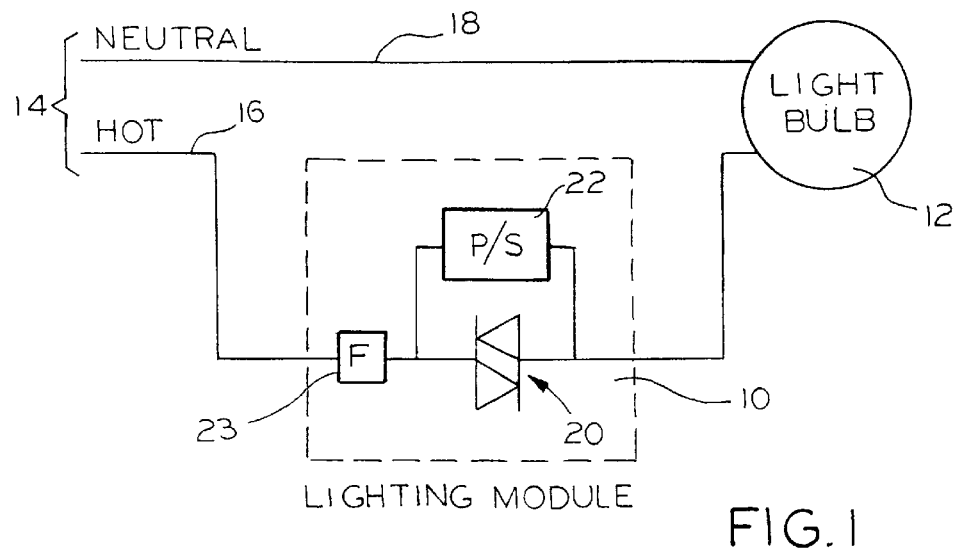
FIG. 1 is an electrical schematic of a lighting system including a lighting module having a switch circuit according to the invention.

Referring initially to FIG. 1, there is illustrated a lighting module 10 for selectively supplying power to a load in the form of an incandescent light bulb circuit 12 from a source of AC power 14 including a hot line 16 and a neutral line 18. The neutral line 18 is connected directly from the power source 14 to the load 12. The lighting module, or switch circuit, 10 is connected between the hot line 16 and an opposite side of the load 12. Particularly, the lighting module 10 includes a gate controlled switch in the form of a triac 20 connected between the hot line 16 and the load 12. A power supply circuit 22 is included for powering remaining components of the lighting module, discussed below. A filter circuit 23 is connected in series with the triac 20.

With the lighting module triac 20 in a "open" position, the power supply 22 bleeds enough current to power all required circuitry without lighting the light bulb 12. To set the lighting module triac to a "closed" position, the triac is controlled to turn on up to eighty percent of the time to prevent the power supply 22 from being shorted out and thus disabling the lighting module 10.

Figure 2:
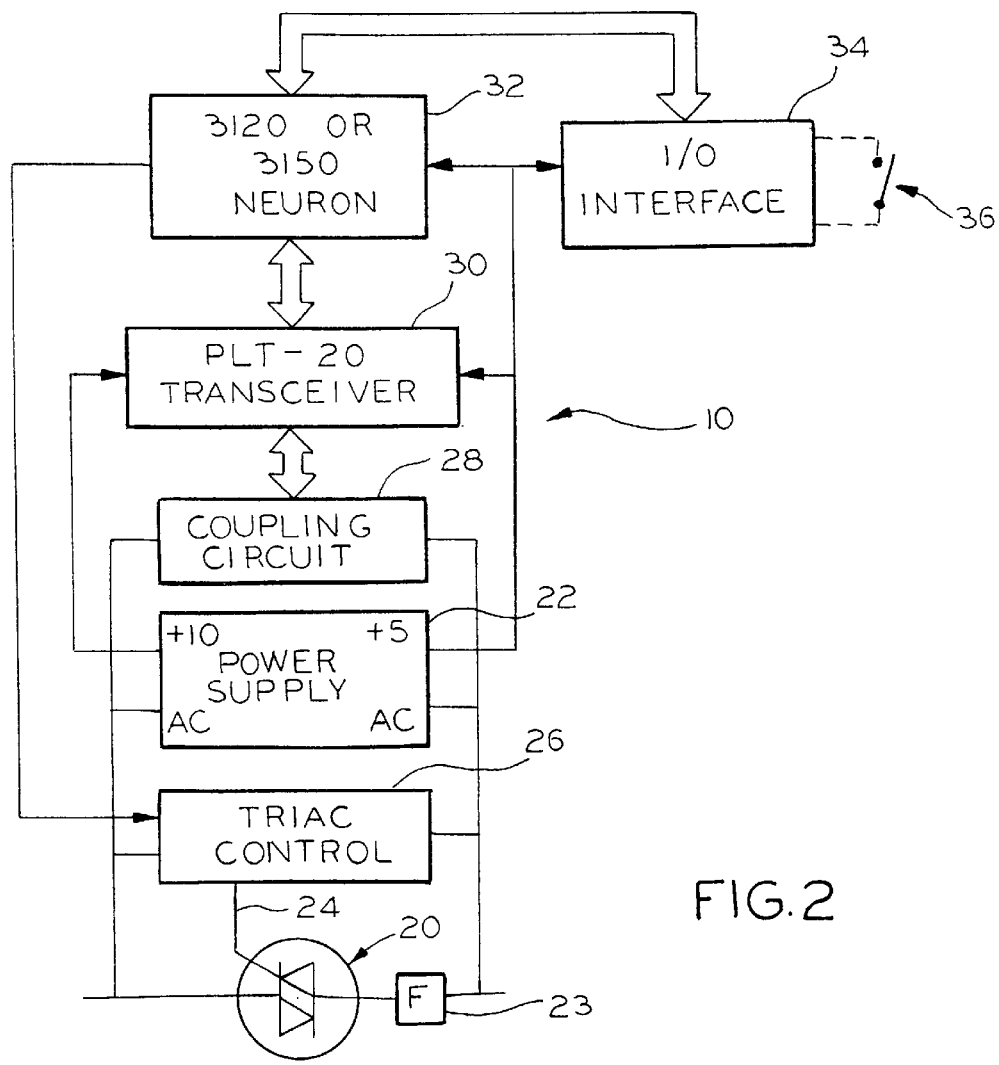
FIG. 2 is a block diagram of the lighting module of FIG. 1.

Referring to FIG. 2, the lighting module 10 is illustrated in greater detail in block diagram form.

As discussed above, the triac 20 is connected between the hot line 16 and the light bulb circuit 12. The triac conducts for either polarity of current on the hot line 16. The triac is controlled by a gate 24 connected to a conventional triac control 26. The triac control 26 is also connected across the triac 20.

The lighting module 10 further includes the power supply circuit 22 having an AC input, as indicated, connected across the triac 20. The power supply circuit 22 is operable to convert AC power to regulated DC power provided at terminals labeled +5V and +12V. A coupling circuit 28 is also connected across the triac 20. The coupling circuit 28 is a passive circuit which provides coupling between the line and a transceiver circuit 30. The transceiver circuit 30 provides an interface to the transmission media, i.e., the power line, and converts the narrow band signal extracted by the coupling circuit to a binary signal which is transferred to a processor circuit 32. The processor circuit 32 may be, for example, a Neuron® type 3120 or 3150 integrated circuit designed by Echelon Corporation including firmware programming for controlling operation of the lighting module 10. The particular program is not important to the invention, other than with respect to limiting conduction of the triac 20, as discussed below. The transceiver circuit 30 and processor circuit 32 are powered by DC power from the power supply 22. The processor circuit 32 responds to commands received on the power line via the coupling circuit 28 and transceiver circuit 30 and controls operation of the triac control 26 to turn the light bulb 12 on or off. Likewise, the processor circuit 32 can send signals via the transceiver circuit 30 and coupling circuit 28 to the power line for transmission to other modules in the system.

Also connected to the processor circuit 32 is an I/O interface 34. The I/O interface 34 can be used for connecting to a keypad for programming the processor circuit 32, to LED's for providing indication and to a toggle switch 36 switched for determining if the light 12 should be on or off. Alternatively, the light 12 can be turned on or off in response to coded input commands received from the power line in the normal fashion.

With power line carrier technology, the power lines are used as transmission lines to transmit control signals. The control signals are carried on a carrier signal impressed on the power lines without interfering with power transmission. The transceiver circuit 30 is used as an interface for transmitting or receiving input commands from or onto the power lines.

The use of power line carrier technology, as discussed immediately above, for turning the light bulb 12 on or off is not unique. The uniqueness herein lies in the switched leg theory of supplying power from the hot line only for powering the electronic circuitry used in controlling the triac 20.

Figure 3:
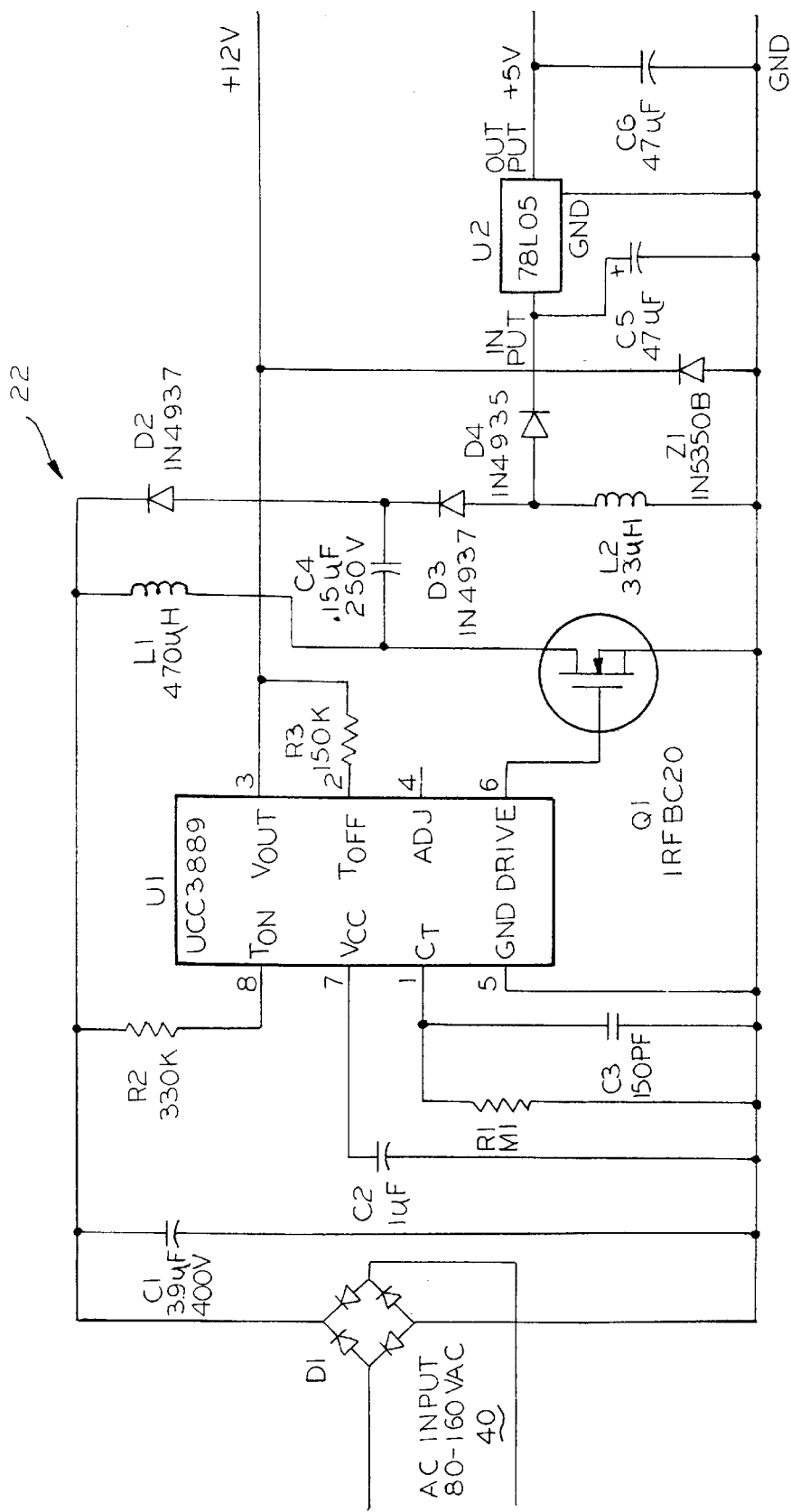
FIG. 3 is an electrical schematic of the power supply of FIG. 2.

Referring to FIG. 3, an electrical schematic illustrates the circuit for the power supply 22. The power supply 22 includes an AC input 40 which receives AC power across the triac 20. The AC power is supplied to a full wave bridge rectifier circuit D1 which converts the AC power to DC power across a capacitor C1. The operation of the power supply 22 is controlled by an off line power supply controller circuit U1, such as a Unitrode UCC3889 integrated circuit chip. The controller U1 is designed for use as an off-line, low power, low voltage, regulated bias supply for developing regulated DC voltage at outputs labeled +12V and +5V. The controller U1 converts a wide range AC input to a fixed DC output. The circuit used in the controller U1 operates as two cascaded flyback converters, each operating in a discontinuous mode, and both driven from a single external power switch in the form of a transistor Q1. The control algorithm used by the controller U1 forces the switch Q1 on time to be inversely proportional to the input line voltage, while the switch off time is made inversely proportional to the output voltage. This action is automatically controlled by an internal feedback loop and reference. The transistor Q1 is connected to a DRIVE output pin of the controller U1. A pin CT is connected across a parallel combination of a resistor R1 and timing capacitor C3. As the voltage on pin CT crosses the oscillator upper threshold, the DRIVE output goes low. As the voltage on CT crosses the oscillator lower threshold, the DRIVE output goes high. The pin $T_{OFF}$ sets the discharge current of the timing capacitor through an external resistor R3 connected between $V_{OUT}$ and $T_{OFF}$. A capacitor C2 is connected between the VCC pin and ground. A resistor R2 is connected between pin $T_{ON}$ and the high side of the AC input. The $V_{OUT}$ pin provides the regulated ten volt supply. A voltage regulator circuit U2, such as a type 78L0F circuit, provides regulated +5V output.

As described, the power supply circuit 22 converts the AC power at the AC input to regulated DC power for powering the transceiver circuit 30, the processor circuit 32, and the I/O interface circuit 34. The invention lies particularly in controlling the triac 20 via the triac control 26 to provide sufficient AC power across the switch so that there is ample supply at the power supply AC input 40. When the triac 20 is open, the AC input 40 sees the full 120V supply. If the triac 20 were fully closed, then there would be a dead short and no power would be supplied to the power supply 22, which would turn off. Therefore, in accordance with the invention, the processor circuit 32 operates the triac control 26 so that the triac 20 is never turned on 100% of the cycle time. Instead, the maximum turn on time is approximately 80% of the cycle time.

Figure 4:
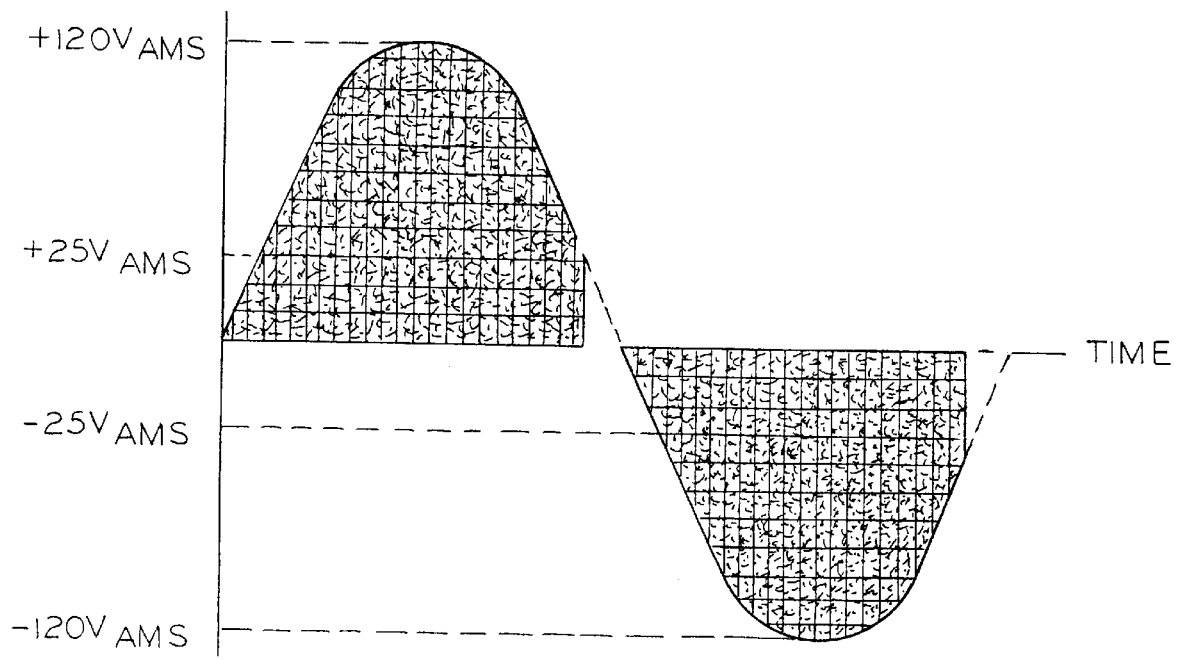
FIG. 4 is a curve illustrating operation of control of the triac of FIG. 1 to provide sufficient AC power across the triac to power the power supply circuit.

Referring to FIG. 4, a wave diagram illustrates control of the triac 20 from the processor circuit 32 via the triac control 26 when the light bulb 12 is turned on, as commanded by the switch 36 or a signal on the power line. When the light bulb is to be turned on, the triac is allowed to conduct, through software control, until about ±25 volts RMS. This represents about 80% of the waveform. At this time it is shut off, thus maintaining a 24V AC supply to the power supply circuit 22. The specific software in the processor circuit 32 to accomplish this and the configuration of the triac control 26 are conventional in nature and would be readily apparent to one skilled in the art.

Figure 5:
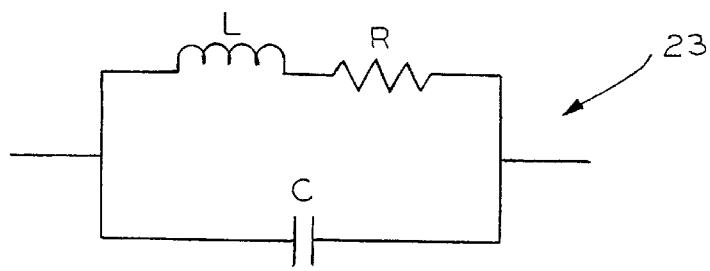
FIG. 5 is a schematic of a filter circuit used in the lighting module of FIGS. 1 and 2.

As discussed above, power line carrier technology is used for transmitting input commands. The carrier signal operates at a select frequency on the order of, for example, 134 kHz. When the triac 20 is on, the carrier signal may be shorted. This reduces reliability of control signal transmission. To avoid this problem, the filter circuit 23, see FIG. 5 is used in series with the triac. The filter circuit 23 includes a parallel combination of a capacitor C and a series resistor R and inductor L. The filter circuit 23 acts as a band stop filter that stops any signal in the range of approximately 120 to 140 kHz when used with the exemplary carrier signal. This eliminates problems due to shorting in this frequency range.

Thus, in accordance with the invention, a trickle power supply circuit operates in accordance with the switched leg theory by obtaining all power off of the switch leg or hot line 16 by simply limiting turn on time of the triac switch 20 to ensure sufficient voltage to power the power supply 22.

I claim:

1. A switch circuit for selectively supplying power to a load from a source of AC power including a hot line and a neutral line, the neutral line being connected directly to the load, the switch circuit comprising:
   a controlled switch connected between the hot line and the load;
   a filter circuit coupled in series with the controlled switch;
   a power supply circuit having an AC input connected across the controlled switch and including means for converting AC power at the AC input to DC power;
   input means for determining the operating status of the load; and
   a control circuit powered by DC power from the power supply circuit and connected to the input means and the controlled switch, the control circuit controlling switching of the controlled switch to maintain the operating status of the load determined by the input means, the control circuit including means for limiting conduction time of the controlled switch during each AC operating cycle to provide sufficient AC power across the switch to power the power supply circuit.

2. The switch circuit of claim 1 wherein said controlled switch comprises a gate controlled switch.

3. The switch circuit of claim 1 wherein said controlled switch comprises a triac.

4. The switch circuit of claim 1 wherein said power supply circuit includes a bridge rectifier circuit converting AC power to unregulated DC power and an off-line power supply controller converting the unregulated DC power to regulated DC power.

5. The switch circuit of claim 4 wherein said off-line power controller comprises an integrated circuit operating as two cascaded flyback converters, each operating in the discontinuous mode, and both driven from an external power switch.

6. The switch circuit of claim 5 wherein the integrated circuit forces the power switch on time to be inversely proportional to input voltage and power switch off time is inversely proportional to output voltage.

7. The switch circuit of claim 1 wherein the control circuit comprises a processing circuit and the limiting means limits conduction to eighty percent of available power.

8. The switch circuit of claim 1 wherein the filter circuit comprises a band stop filter.

9. A switch circuit for selectively supplying power to a load from a source of AC power including a hot line and a neutral line, the neutral line being connected directly to the load, the switch circuit comprising:
   a controlled switch connected between the hot line and the load;
   a power supply circuit having an AC input connected across the controlled switch and including means for converting AC power at the AC input to DC power;
   input means for determining the operating status of the load,
   wherein the input means comprises a power line transceiver circuit operatively connected across the switch and using a carrier signal at a select frequency impressed on the power line for determining operating status of the load; and
   a control circuit powered by DC power from the power supply circuit and connected to the input means and the controlled switch, the control circuit controlling switching of the controlled switch to maintain the operating status of the load determined by the input means, the control circuit including means for limiting conduction time of the controlled switch during each AC operating cycle to provide sufficient AC power across the switch to power the power supply circuit.

10. The switch circuit of claim 9 further comprising a band stop filter circuit coupled in series with the controlled switch, the filter circuit filtering out signals at the select frequency.

11. A light switch circuit for selectively supplying power to an incandescent light from a source of AC power including a hot line and a neutral line, the neutral line being connected directly to the load, the switch circuit comprising:
   a gate controlled switch connected between the hot line and the light;
   a filter circuit coupled in series with the controlled switch;
   a power supply circuit having an AC input connected across the controlled switch and including means for converting AC power at the AC input to DC power;
   input means for determining if the light should be on or off; and
   a control circuit powered by DC power from the power supply circuit and connected to the input means and the gate controlled switch, the control circuit controlling switching of the gate controlled switch to turn the light on or off as determined by the input means, the control circuit including means for limiting conducting time of the gate controlled switch during each AC operating cycle when the light is on to provide sufficient AC power across the gate controlled switch to power the power supply circuit.

12. The switch circuit of claim 11 wherein said gate controlled switch comprises a triac.

13. The switch circuit of claim 11 wherein said power supply circuit includes a bridge rectifier circuit converting AC power to unregulated DC power and an off-line power supply controller converting the unregulated DC power to regulated DC power.

14. The switch circuit of claim 13 wherein said off-line power controller comprises an integrated circuit operating as two cascaded flyback converters, each operating in the discontinuous mode, and both driven from an external power switch.

15. The switch circuit of claim 14 wherein the integrated circuit forces the power switch on time to be inversely proportional to input voltage and power switch off time is inversely proportional to output voltage.

16. The switch circuit of claim 11 wherein the control circuit comprises a processing circuit and the limiting means limits conduction to eighty percent of available power.

17. The switch circuit of claim 11 wherein the filter circuit comprises a band stop filter.

18. A light switch circuit for selectively supplying power to an incandescent light from a source of AC power including a hot line and a neutral line, the neutral line being connected directly to the light, the switch circuit comprising:

a gate controlled switch connected between the hot line and the light;

a power supply circuit having an AC input connected across the controlled switch and including means for converting AC power at the AC input to DC power;

input means for determining if the light should be on or off, wherein the input means comprises a power line transceiver circuit operatively connected across the switch and using a carrier signal at a select frequency impressed on the power line for determining operating status of the light; and a control circuit powered by DC power from the power supply circuit and connected to the input means and the gate controlled switch, the control circuit controlling switching of the gate controlled switch to turn the light on or off as determined by the input means, the control circuit including means for limiting conduction time of the gate controlled switch during each AC operating cycle when the light is on to provide sufficient AC power across the gate controlled switch to power the power supply circuit.

19. The switch circuit of claim 18 further comprising a band stop filter circuit coupled in series with the controlled switch, the filter circuit filtering out signals at the select frequency.

* * * * *